Sept. 8, 1959

E. T. LEWIS ET AL 2,902,814

CUTTING ASSEMBLY FOR ROTARY POWER MOWERS

Filed Aug. 16, 1957

INVENTORS
EVAN T. LEWIS
HOMER G. SANBORN, JR.
BY
Morgan, Finnegan, Durham & Pine
ATTORNEYS.

Sept. 8, 1959    E. T. LEWIS ET AL    2,902,814
CUTTING ASSEMBLY FOR ROTARY POWER MOWERS
Filed Aug. 16, 1957    2 Sheets-Sheet 2

INVENTORS
EVAN T. LEWIS
HOMER G. SANBORN, JR.
BY
Morgan, Finnegan, Durham & Pine
ATTORNEYS United States Patent Office 2,902,814
Patented Sept. 8, 1959

2,902,814

CUTTING ASSEMBLY FOR ROTARY POWER MOWERS

Evan T. Lewis, Stroudsburg, and Homer G. Sanborn, Jr., East Stroudsburg, Pa., assignors to Worthington Mower Company, Stroudsburg, Pa., a corporation of Delaware Application August 16, 1957, Serial No. 678,667

1 Claim. (Cl. 56—25.4)

This invention relates to rotary type power lawn mowers, and more particularly to the cutting assemblies for such mowers.

Rotary type power mowers utilize a rotating cutting bar or cutting disc with blades to contact and cut the grass. It is common practice for the cutting edges of the bar or blades to be tilted to obtain a suction or vacuum effect which tends to straighten the grass into a vertical position. With such arrangements, the grass is cut at relatively uniform lengths and in addition any flat lying grass is pulled upright where it can be mowed.

Rotary mowers, however, generally provide less efficient cutting action than other types of mowers. The tilted cutting edges tend to "slap" the grass. Upper tips of the grass tend to be bruised and the grass is deleteriously effected. In many instances, a noticeable yellow sheen develops which distracts from the beauty of the grass. In addition, the vacuum created is not as effective as desired because apparently interfering eddy currents are developed directly athwart the point where the grass is cut.

The present invention obviates the above disadvantages. Speaking generally, the present invention provides a rotary cutting assembly which cuts the grass without bruising of the tips, which does not tend to slap the grass, and which avoids the development of yellow sheen. The vacuum effect is retained so that the grass is more efficiently held in a rigid vertical position for cutting by the blades without the development of interfering eddy currents.

Briefly, this is accomplished in a rotary lawn mower by providing a cutting assembly with a vertically disposed power driven rotatable shaft. A disc is concentrically affixed to the lower end of the shaft for rotation in a horizontal plane. The disc has at least one upwardly tilted impeller affixed to its upper surface and adjacent its periphery, the direction of the tilt being opposite to the direction of rotation. At least one horizontally disposed cutting blade is mounted on the disc to project beyond the periphery of the disc for conjoint rotation therewith and has a cutting edge at its rotationally forward edge to mow the grass. Preferably, the disc is constructed with an aperture below the impeller, and more preferably, the impeller is integral with the disc. Still more preferably, two impellers are provided at opposite positions on the periphery of the disc and four cutting blades are provided equi-spaced around the disc for balancing of the entire assembly.

The foregoing and other advantages of the invention will become more readily apparent upon examination of the illustrative and preferred embodiment of the invention described in detail in the following description in conjunction with the drawings.

Figure 1:
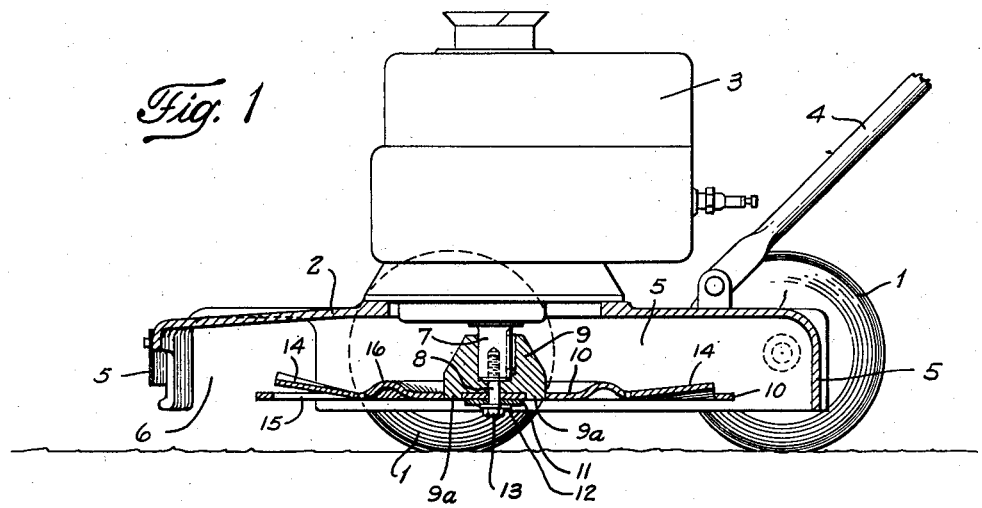
Figure 1 is a side elevation of a rotary mower with the deck and cutting assembly shown in section along the lines 1—1 of Figure 2.

Figure 1 shows a rotary power driven lawn mower having four transportation wheels 1 which are attached for rotation to a deck 2 for horizontal support of the entire mower. A power source, such as the usual gasoline or electric engine 3, is mounted on top of the deck 2 to drive the cutting assembly discussed below. As illustrated in Figure 1, the engine is snugly mounted in a centrally disposed opening in the top of the deck; and, the top of the deck, therefore, is closed. The usual handle 4 is attached at its lower end to the rear of the deck 2 for control of the mower by the operator.

The deck 2 has depending sides and front and rear panels 5 to form an enclosure for the cutting assembly and to block throwing of stones and other miscellaneous articles, as is customary. In addition, the depending front and side panels are formed to provide the usual exit port 6 for controlled scattering of the grass clippings. See Figure 2.

Figure 2:
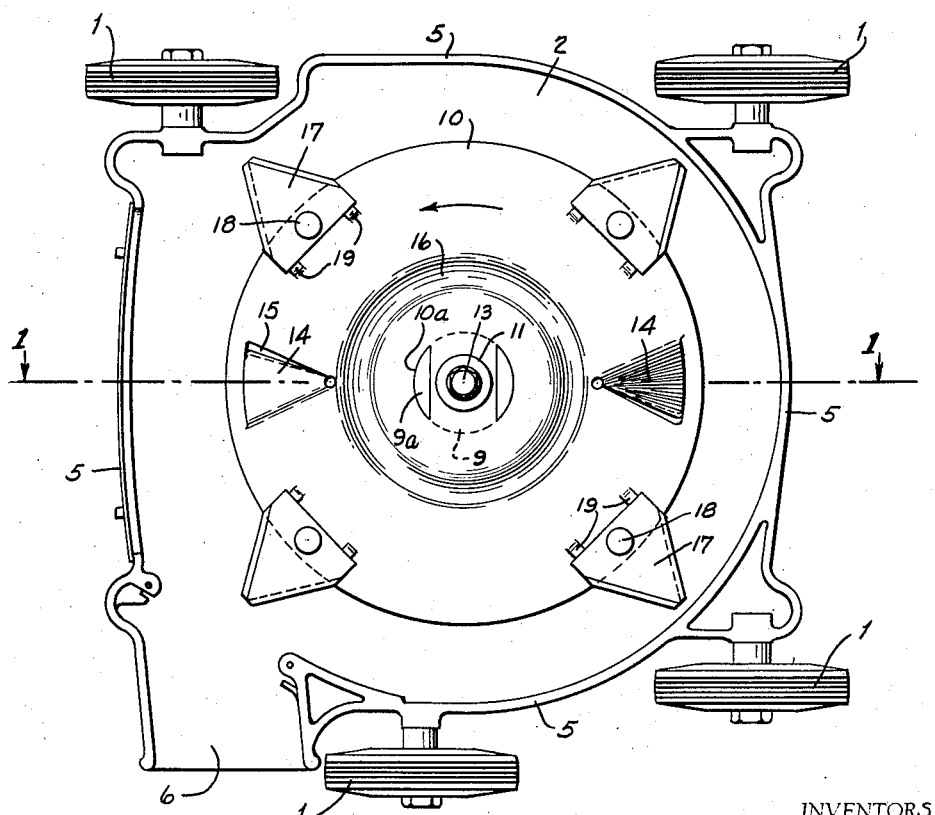
Figure 2 is a bottom plan view of the mower shown in Figure 1.

A rotor 7 is driven by the drive shaft of the engine 3 in the single direction shown by the curved arrows on Figures 2–5 of the drawing and may be integral therewith. The rotor 7 is vertically disposed and projects downwards into the enclosure below deck 2 and is internally threaded at its lower terminus. A hub member 9 is keyed to rotor 7 and has two downwardly depending fingers 9a which are in the shape of half-moons (Figure 2). A disc 10 (Figure 3) is concentrically affixed to the rotor 7 for conjoint rotation in the direction of the arrows shown on the drawings. A cap bolt 8 is inserted upwardly through an aperture in the center of the disc 10 and is threaded into the rotor 7. The two half-moon fingers 9a of the hub 9 pass through and cooperate with corresponding half-moon apertures 10a in the disc 10. The disc is held tight against the hub 9 on the cap bolt 8 of the rotor 7 by means of a main washer 11, lock washer 12 and the head 13 of the bolt.

Figure 3:
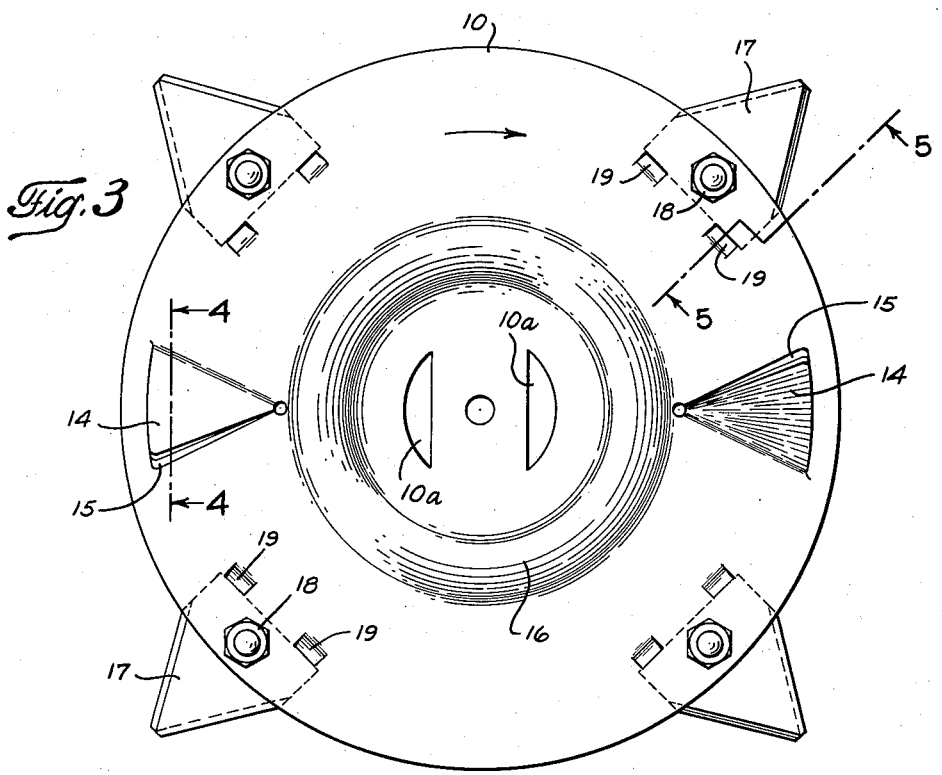
Figure 3 is a plan view of the upper surface of the cutting assembly.
Figure 4:
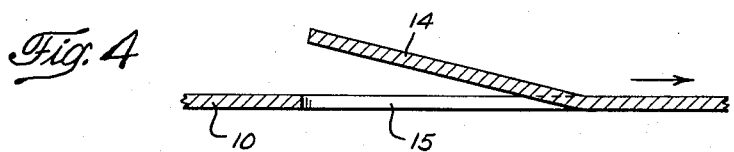
Figure 4 is a fragmentary section on the lines 4—4 of Figure 3.
Figure 5:
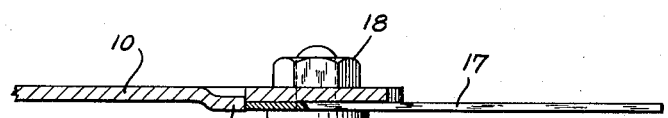
Figure 5 is a fragmentary section view on the line 5—5 of Figure 3.

As shown in Figure 3, the disc 10 has a configuration of a flat circular plate. On its upper surface at oppositely spaced positions within and near its periphery, the disc 10 has two impeller surfaces 14 which are tilted upwardly and in the direction opposite to the direction of rotation, i.e. rearwardly. The disc has an aperture 15 directly beneath each impeller so that the impeller surface 14 is attached to the disc along the rotationally forward edge of its adjacent aperture 15. (See Figure 4.) As shown in the preferred embodiment of the drawings, the impellers are integral parts of the disc and may be prepared by stamping them directly from the disc. For added strength, the disc may be formed with a circular rib 16 midway between its center and its periphery, as it is shown in the drawing.

Four cutting blades 17 are mounted on the undersurface of disc 10 for conjoint rotation therewith by means of nuts and bolts 18 in equi-spaced position around the circumference to balance the disc. Each projects beyond the circumference of the disc with its cutting edge at the rotationally forward edge thereof. Independent pivoting movement of each cutting blade 17 on nut 18 is limited by punched indents 19 which are formed in the disc to provide backstops for the rear end of each cutting blade 17. Since the disc 10 is mounted on the rotor shaft 7 for movement in a horizontal plane during operation and the blades 16 lie flat against the disc, they too are disposed in the horizontal plane of the disc. Although not limited thereto, we find that four such cutting blades 17 is a number that provides superior cutting action and insures adequate balance of the disc so as to avoid vibration and other harmful effects during rotation.

The same is true with respect to the number of impellers 14—we find two such impellers provide good vacuum action and do not create problems in imbalance or vibration.

As shown in Figure 2, the front panel and one of the side panels 5 locate the exit port 16 tangential to the periphery of the disc on the rotationally forward side of the disc, and the plane of the disc intersects the exit port.

In operation of the mower described above, the impellers of the rotating cutting assembly create a vacuum above the disc which stands up the grass in a vertical position adjacent the cutting blades 17. Apparently the eddy currents created by the impellers are above the plane of the cutting blades and displaced radially toward the center of the disc. There appears to be substantially no interference with the cutting action because the impellers are located above the blades and inboard of the blades. In addition, the vacuum and pressure conditions within the deck enclosure reach an equilibrium status and appear to accommodate more readily to changes in the quantity of grass being cut. The apertures 15 in the disc beneath each impeller 14 provide a relief conduit for the movement of air from beneath the disc to the area in the deck enclosure above the disc from whence the air moves outwardly through exit port 16 with the grass clippings. This relief provides and facilitates more efficient discharge of the clippings. In addition, since each of the cutting blades is horizontally disposed, the cutting edge of each blade 16 approaches the grass at a 90 degree angle to the shafts thereof so that the area of grass shaft penetrated by the cutting edge is reduced to minimum. There appears to be little or no slapping of the grass.

Since variations and modifications can be made in the preferred embodiment of the invention illustrated and described above, without departing from the scope of the invention, it should be recognized that the invention is not limited to the details described and illustrated unless expressly limited in the claim.

We claim:

A rotary lawn mower having a mobile deck with a top and depending side and front and rear panels to form an enclosure, a vertically disposed rotatable shaft within the enclosure and carried by the deck and power driven to rotate in a single direction only, a horizontally disposed disc concentrically fixed to the lower end of the shaft and driven thereby, said disc having at least one upwardly tilted impeller adjacent an aperture in the disc, and at least one cutting blade projecting beyond the periphery of the disc, characterized in that the top of the deck is closed, each impeller is attached along the forward edge of its adjacent aperture and is upwardly inclined rearwardly, each cutting blade is disposed in the plane of the disc, and the front panel and one of the side panels have an exit port located tangential to the edge of the disc on the rotationally forward side thereof, the plane of the disc intersecting the exit port, whereby air is moved upwardly from beneath the disc through each aperture to above the disc within the enclosure and thence outwardly through the exit port with grass clippings during rotation of the shaft and grass cuttings are expelled through the exit port both by the air moved by each impeller and by the cutting blades.

References Cited in the file of this patent

UNITED STATES PATENTS

| | | |
|---|---|---|
| 1,336,257 | Muzzy | Apr. 6, 1920 |
| 2,728,182 | Fulton et al. | Dec. 27, 1955 |
| 2,760,327 | Bovee | Aug. 28, 1956 |
| 2,764,865 | Pollard | Oct. 2, 1956 |
| 2,791,078 | Kiekhaefer | May 7, 1957 |